United States Patent
Opdahl

(10) Patent No.: US 11,136,200 B2
(45) Date of Patent: Oct. 5, 2021

(54) CONVEYANCE SYSTEM WITH VARIABLE SPEED ROLLERS

(71) Applicant: Thermal Product Solutions, New Columbia, PA (US)

(72) Inventor: Barry J. Opdahl, Williamsport, PA (US)

(73) Assignee: THERMAL PRODUCT SOLUTIONS, New Columbia, PA (US)

( * ) Notice: Subject to any disclaimer, the term of this patent is extended or adjusted under 35 U.S.C. 154(b) by 0 days.

(21) Appl. No.: 16/830,528

(22) Filed: Mar. 26, 2020

(65) Prior Publication Data

US 2020/0223643 A1 Jul. 16, 2020

Related U.S. Application Data

(63) Continuation of application No. 16/014,790, filed on Jun. 21, 2018, now Pat. No. 10,633,194.

(51) Int. Cl.
*B65G 47/31* (2006.01)
*B65G 13/06* (2006.01)

(52) U.S. Cl.
CPC .............. *B65G 47/31* (2013.01); *B65G 13/06* (2013.01)

(58) Field of Classification Search
CPC ....... B65G 47/31; B65G 17/061; B65G 13/06
USPC ........................................................ 198/789
See application file for complete search history.

(56) References Cited

U.S. PATENT DOCUMENTS

| | | |
|---|---|---|
| 6,439,378 B1 | 8/2002 | Maclachlan |
| 8,622,202 B2 | 1/2014 | Rau et al. |
| 8,833,260 B2 | 9/2014 | Kim et al. |
| 9,727,961 B2 | 8/2017 | Wang et al. |
| 10,392,192 B2 * | 8/2019 | Gabor ..................... B65G 17/24 |
| 10,479,616 B2 * | 11/2019 | Wipf ....................... B65G 17/24 |
| 2009/0090599 A1 * | 4/2009 | Fourney .................. B65G 47/29 198/345.3 |
| 2009/0096153 A1 | 4/2009 | Katsura et al. |
| 2016/0039061 A1 | 2/2016 | Feyrer |
| 2016/0251169 A1 | 9/2016 | Stefanko |

FOREIGN PATENT DOCUMENTS

| | | |
|---|---|---|
| CN | 201971463 U * | 1/2011 |
| WO | 2017/023983 A1 | 2/2017 |

OTHER PUBLICATIONS

Non-Final Office Action received for U.S. Appl. No. 16/014,790 dated Jun. 20, 2019, 20 pages.
Non-Final Office Action received for U.S. Appl. No. 16/014,790 dated Sep. 17, 2019, 39 pages.

* cited by examiner

*Primary Examiner* — Gene O Crawford
*Assistant Examiner* — Lester Rushin, III
(74) *Attorney, Agent, or Firm* — Amin, Turocy & Watson, LLP

(57) ABSTRACT

Techniques regarding a conveyance system with variable speed rollers are provided. For example, one or more embodiments described herein can comprise an apparatus, which can comprise a roller attached to a support member that is operatively coupled to a first gear. The first gear can drive a conveyance of the support member and the roller in a first direction. The apparatus can also comprise a shaft that can operatively couple the roller to a second gear. The second gear can drive a rotation of the roller in an axial direction.

20 Claims, 10 Drawing Sheets

CONVEYANCE SYSTEM WITH VARIABLE SPEED ROLLERS

CROSS-REFERENCE TO RELATED APPLICATIONS

This application is continuation of and claims priority to U.S. patent application Ser. No. 16/014,790 filed on Jun. 21, 2018, entitled "CONVEYANCE SYSTEM WITH VARIABLE SPEED ROLLERS." The entirety of the aforementioned application is incorporated by reference herein.

BACKGROUND

The subject disclosure relates to conveyance system, and more specifically, to a conveyance system that can comprise one or more rollers that can rotate at one or more variable speeds.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems and/or apparatuses that can convey an article in one direction while rotating the article in a second direction are described.

According to an embodiment, an apparatus is provided. The apparatus can comprise a roller attached to a support member that is operatively coupled to a first gear. The first gear drives a conveyance of the support member and the roller in a first direction. The apparatus can also comprise a shaft that operatively couples the roller to a second gear, wherein the second gear drives a rotation of the roller in an axial direction.

According to another embodiment, a system is provided. The system can comprise a platform located between a first support member and a second support member. The platform can be attached to the first support member and the second support member. The system can also comprise a driving mechanism operatively coupled to the first support member and the second support member. The driving mechanism can propel the platform, the first support member and the second support member in a first direction. Also, the system can further comprise a rotation mechanism operatively coupled to the platform. The rotation mechanism can rotate the platform in an axial direction.

According to another embodiment, a system is provided. The system can comprise a roller comprised within a conveyor system that facilitates a conveyance of the roller along a first direction. Also, the system can comprise a rotation mechanism operatively coupled to the roller, wherein the rotation mechanism facilitates a rotation of the roller along an axial direction.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Conventional conveyors, such as conveyor belts, can facilitate transporting an article from one location to another along a defined path and at a defined speed. Conveyors can be used to automate a multitude of processes (e.g., manufacturing processes). However, one or more processes can require additional manipulation of the article during transport along the conveyance path. For example, one or more manufacturing processes can require an article to be rotated while being conveyed. For instance, rotation of the article can: facilitate uniform exposure of the article's surface for heating or cooling; prevent gravity from distorting the article as it is being processed; and/or facilitate mixing liquids and/or suspensions during processing.

Various embodiments described herein can regard systems and/or apparatuses that can facilitate additional manipulation of an article being conveyed along a conveyance path. For example, one or more embodiments can comprise one or more features that can facilitate rotating an article while the article is being conveyed from one location to another. Further, one or more embodiments can facilitate rotating the article at a rotation speed that is independent of the conveyance speed. For instance, the rotation speed can be varied, changed, reversed, and/or stopped without affecting the conveyance speed. Conversely, the conveyance speed can be varied, changed, reversed, and/or stopped without affecting the rotation speed. In addition, one or more embodiments can facilitate rotating multiple articles at respective rotation speeds (e.g., independent of each other) that are independent of the conveyance speed.

Figure 1:
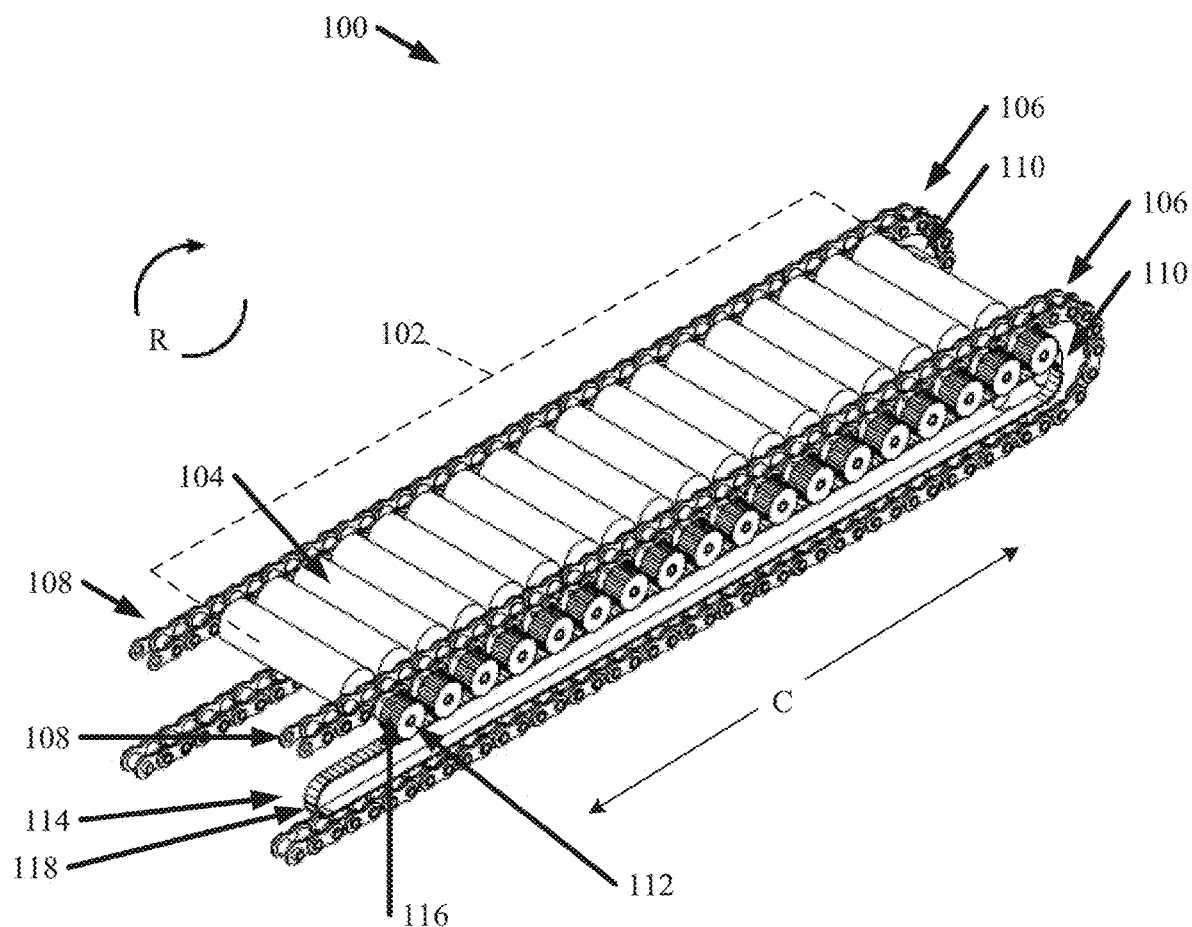
FIG. 1 illustrates a diagram of an example, non-limiting conveyance system that can facilitate conveying an article in one direction while rotating the article in a second direction in accordance with one or more embodiments described herein.

FIG. 1 illustrates a diagram of an example, non-limiting conveyance system 100 that can facilitate conveying an article along a conveyance direction while rotating the article along a rotation direction (e.g., an axial direction) in accordance with one or more embodiments described herein. As shown in FIG. 1, the "C" arrow can represent the conveyance direction and/or the "R" arrow can represent the rotation direction.

The conveyance system 100 can comprise a platform 102 (e.g., represented by dashed lines in FIG. 1), which can comprise one or more rollers 104. The one or more rollers 104 can be characterized by any structure and/or shape that can support an article and/or can be rotated. For instance, although rollers 104 with a cylindrical shape are shown in FIG. 1, the rollers 104 can also have a polygon shape. Example structures that can characterize the rollers 104 can include, but are not limited to: cylinders, squares, rectangles, triangles, plates, boxes, cups, wires, trapezoids, a hemisphere, a dome, a combination thereof, and/or the like. Additionally, one or more rollers 104 can vary in size and/or can be spaced apart from each other by various distances. For example, the one or more rollers 104 can have a diameter of 1.25 inches (in) and/or can be spaced apart on 1.5 in, allowing a 0.25 in space between rollers 104. Additionally, the one or more rollers 104 can be hard coat anodized to increase durability and/or Teflon impregnated to ease in cleaning.

Further, the one or more rollers 104 can have one or more features that can facilitate an interaction with an article to be supported by the platform 102 and/or a process that can be applied to the article. For example, one or more of the rollers 104 can comprise holes (e.g., located on the surface of the rollers 104), cavities, compartments, a combination thereof, and/or the like. For instance, one or more of the rollers 104 can be hollow. Additionally, the one or more rollers 104 can comprise grooves, notches, ridges, bumps, a combination thereof, and/or like to facilitate placement of an article onto the platform 102. Also, the one or more rollers 104 can be made from a variety of materials depending on the application of the conveyance system 100. Example materials can include, but are not limited to: metal, metal alloys (e.g., steel), plastic, plastic composites, stone, clay, a combination thereof and/or the like. One of ordinary skill in the art will recognize that a plethora of materials can be utilized to contrast the one or more rollers 104.

Moreover, while FIG. 1 depicts each roller 104 of the platform 102 as having the same structural characteristics (e.g., height, shape, width, material, surface structure, and/or length), one of ordinary skill in the art will recognize that the architecture of the platform 102 is not so limited. For example, respective rollers 104 of the platform 102 can have respective structural characteristics independent of one or more other rollers 104 comprised within the platform 102. For instance, half of the rollers 104 can be characterized by a first structural feature (e.g., a hollow cylindrical shape) while another half of the rollers 104 can be characterized by a second structural feature (e.g., a rectangular plate with one or more holes).

The platform 102 (e.g., via the one or more rollers 104) can be operatively coupled to one or more conveyance mechanism 106. The conveyance mechanism 106 can be located adjacent to a single side of the platform 102 and/or adjacent to multiple sides of the platform 102. For example, FIG. 1 depicts the conveyance mechanism 106 located at distal ends of the one or more rollers 104 (e.g., the left and/or right of the platform 102). The conveyance mechanism 106 can: provide structural support for the platform 102; and/or propel the platform 102 along the conveyance direction (e.g., represented by arrow "C"), thereby conveying the platform 102, and one or more articles supported by the platform 102, from a first location to a second location along the conveyance direction (e.g., represented by arrow "C"). FIG. 1 depicts the conveyance direction (e.g., represented by arrow "C") as a linear path; however, the conveyance direction (e.g., represented by arrow "C") can comprise one or more turns. Additionally, although FIG. 1 shows the conveyance direction (e.g., represented by arrow "C") traversing a horizontal plane, the conveyance direction (e.g., represented by arrow "C") can also traverse a vertical plane (e.g., transitioning from a horizontal plane to a vertical plane).

The conveyance mechanism 106 can comprise one or more support members 108 operatively coupled to the platform 102 (e.g., via the one or more rollers 104). The one or more support members 108 can be located adjacent to a single side of the platform 102 and/or adjacent to multiple sides of the platform 102. For example, FIG. 1 depicts support members 108 located at distal ends of the one or more rollers 104 (e.g., the left and/or right of the platform 102). The one or more support members 108 can provide structural support for the platform 102 along the conveyance direction and/or can facilitate moving the platform 102 along the conveyance direction. The one or more support members 108 can be characterized by one or more structures, which can include, but are not limited to: a belt, a chain, a cord, a rope, a wire, a combination thereof, and/or the like. As used herein, the term "chain" can refer to a series of connected linkages (e.g., connected loops, connected polygons, connected boxes, connected compartments, connected wires, a combination thereof, and/or the like), wherein the linkages can be flexibly linked together to facilitate to conformity to a linear and/or non-linear conveyance path. Example chain structures can include, but are not limited to: a roller chain, a block chain, a skip-link chain, and/or a Simpson lever chain.

Additionally, the conveyance mechanism 106 can comprise one or more first driving members 110. The one or more first driving members 110 can be operatively coupled to the one or more support members 108 and/or facilitate first driving the one or more support members 108 in the conveyance direction (e.g., represented by the "C" arrow). For example, the one or more first driving members 110 can engage the one or more support members 108 and/or transfer mechanical power (e.g., generated by a motor) to the one or more support members 108. Example first driving members 110 can include, but are not limited to: a gear, a wheel, a magnetic, a combination thereof, and/or the like. For instance, the one or more first driving members 110 can comprise one or more ultra-high-molecular-weight ("UHMW") polyethylene sprockets.

FIG. 1 illustrates an embodiment of the conveyance system 100 that can comprise two support members 108, each characterized by a roller chain structure. A first support member 108 can be located a first distal end of the one or more rollers 104 and/or a second support member 108 can be located a second distal end of the one or more rollers 104. Further, the one or more first driving members 110 can be gears. The one or more first driving members 110 (e.g., one or more sprockets and/or one or more gears) can engage the one or more support members 108 (e.g., one or more roller chains). For example, mechanical power (e.g., generated by a motor) can rotate (e.g., along the rotation direction represented by the "R" arrow) the one or more first driving members 110 (e.g., one or more gears), thereby propelling the one or more support members 108 (e.g., one or more roller chains) along the conveyance direction (e.g., represented by the "C" arrow). Thus, as shown in FIG. 1, rotation of the one or more first driving members 110 (e.g., gears) can drive the one or more supporting members 108 (e.g., roller chains) along the conveyance direction (e.g., represented by the "C" arrow), which in turn can propel the platform 102 along the conveyance direction.

The conveyance mechanism 106 (e.g., the one or more support members 108) can be operatively coupled directly to the one or more rollers 104. For example, the one or more support members 108 can engage with one or more surface features (e.g., grooves and/or ridges) located on the one or more rollers 104. Alternatively, the conveyance mechanism 106 (e.g., the one or more support members 108) can be operatively coupled indirectly to the one or more rollers 104. For example, one or more shafts 112 can extend from one or more ends of the one or more one or more rollers 104 and/or connect to the one or more support members 108. The one or more shafts 112 can be characterized by a cylindrical structure and/or a polygon structure. Additionally, the one or more shafts 112 can be rigid (e.g., a rod) and/or flexible (e.g., a wire). Moreover, the one or more shafts 112 can extend from a single location (e.g., a center location) on a respective side of the one or more rollers 104 and/or from multiple locations (e.g., multiple perimeter locations) on a respective side of the one or more rollers 104. Further, the one or more shafts 112 can be fixed to the one or more rollers 104 and/or pass through the one or more rollers 104.

Further, the conveyance system 100 can comprise a rotation mechanism 114, which can rotate the platform 102 (e.g., one or more of the rollers 104) in an axial direction, such as the rotation direction (e.g., represented by the "R" arrow), during conveyance. In one or more embodiments, one or more of the rollers 104 can be operatively coupled to one or more engagement members 116. Example engagement members 116 can include, but are not limited to: a gear, a wheel, a magnetic, a combination thereof, and/or the like. In one or more embodiments, each respective roller 104 can be operably coupled to a respective engagement member 116. Alternatively, in one or more embodiments, an engagement member 116 can be operatively coupled to a plurality of rollers 104.

The one or more engagement members 116 can be operably coupled to the one or more rollers 104 directly (e.g., via direct interaction with a respective surface of the one or more rollers 104) and/or indirectly (e.g., via the one or more shafts 112). For example, the one or more engagement members 116 can be fixed to the one or more shafts 112 and thereby operably coupled to the one or more rollers 104 via the one or more shafts 112. The one or more engagement members 116 can be located at a single side of the platform 102 or at multiple sides of the platform 102. One of ordinary skill in the art will readily recognize that the number of engagement members 116 comprising the rotation mechanism 114 can vary depending on the number of rollers 104 and/or the length of the conveyance system 100.

In one or more embodiments, the one or more shafts 112 can extend through the one or more support members 108 to reach the one or more engagement members 116. For example, one or more bearings can be comprised within the one or more support members 108. The one or more bearings can create one or more holes in the one or more support members 108 into which the one or more shafts 112 can extend. Further, the one or more bearings can facilitate rotation of the one or more shafts 112 (e.g., by reducing friction between the one or more shafts 112 and/or the one or more support members 108 while the one or more shafts 112 rotate).

The one or more rotation mechanisms 114 can comprise one or more rotation members 118 operatively coupled to the one or more engagement members 116, and thereby the one or more rollers 104 (e.g., via the one or more shafts 112). The one or more rotation members 118 can be located adjacent to a single side of the platform 102 and/or adjacent to multiple sides of the platform 102. Additionally, each side of the platform 102 comprising the one or more rotation members 118 can comprise one rotation member 118 and/or a plurality of rotation members 118. For example, FIG. 1 depicts a rotation member 118 located at a distal end of the one or more rollers 104.

The one or more rotation members 118 can facilitate rotating the one or more rollers 104 along an axial direction (e.g., the rotation direction represented by the "R" arrow). The one or more rotation members 118 can be characterized by one or more structures, which can include, but are not limited to: a belt, a chain, a cord, a rope, a wire, a combination thereof, and/or the like.

Figure 3:
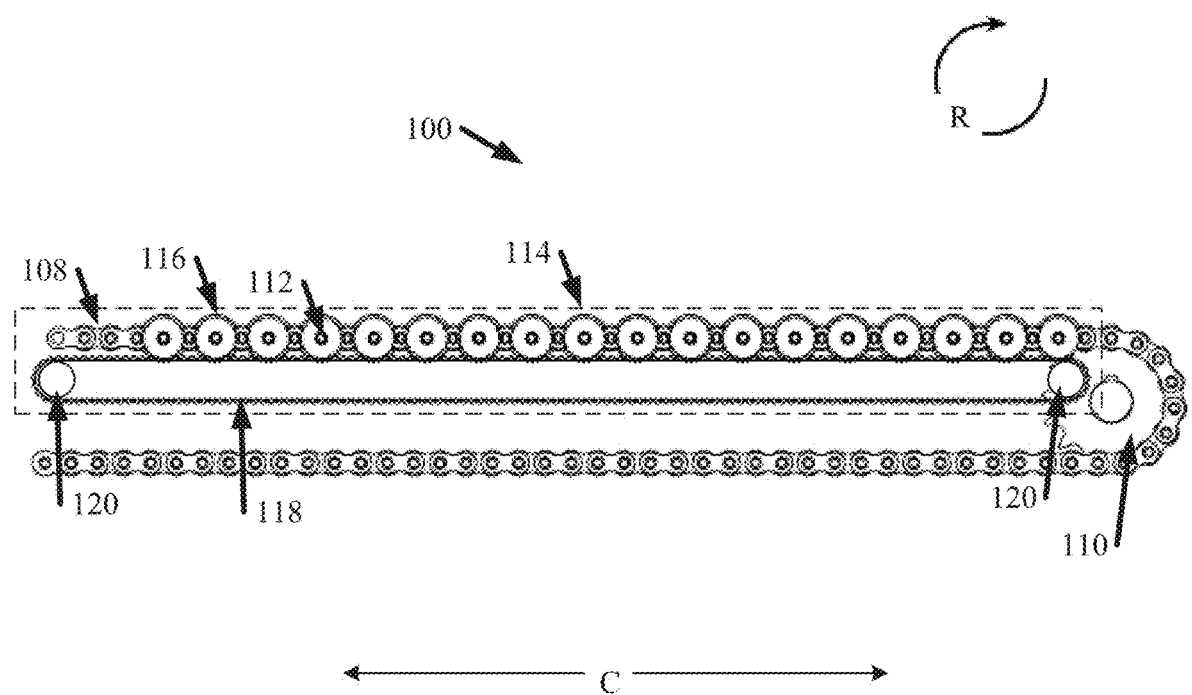
FIG. 3 illustrates a diagram of an example, non-limiting conveyance system that can comprise a conveyance mechanism and a rotation mechanism in accordance with one or more embodiments described herein.

Additionally, the one or more rotation mechanisms 114 can comprise one or more second driving members 120 (e.g., shown in FIGS. 3 and/or 4). The one or more second driving members 120 (e.g., shown in FIGS. 3 and/or 4) can be operatively coupled to the one or more rotation members 118 and/or facilitate driving the one or more rotation members 118 in the conveyance direction (e.g., represented by the "C" arrow). For example, the one or more second driving members 120 (e.g., shown in FIGS. 3 and/or 4) can engage the one or more rotation members 118 and/or transfer mechanical power (e.g., generated by a motor) to the one or more rotation members 118. Example second driving members 120 (e.g., shown in FIGS. 3 and/or 4) can include, but are not limited to: a gear, a wheel, a magnetic, a combination thereof, and/or the like.

The one or more second driving members 120 (e.g., one or more sprockets and/or one or more gears) can engage the one or more rotation members 118 (e.g., one or more belts). For example, mechanical power (e.g., generated by a motor)

can rotate (e.g., along the rotation direction represented by the "R" arrow) the one or more second driving members 120 (e.g., one or more gears), thereby propelling the one or more rotation members 118 (e.g., one or more roller chains) along the conveyance direction (e.g., represented by the "C" arrow); the one or more rotation members 118 can in turn engage the one or more engagement members 116, thereby rotating the one or more engagement members 116 (e.g., along the rotation direction represented by the "R" arrow). Thus, as shown in FIG. 1, rotation of the one or more first driving members 110 (e.g., gears) can drive the one or more rotation members 118 (e.g., roller chains) along the conveyance direction (e.g., represented by the "C" arrow), which in turn can rotate the one or more engagement members 116 along the rotation direction (e.g., represented by the "R" arrow).

Further, rotation of the one or more engagement members 116 can cause the rotation of the one or more rollers 104. For example, the one or more engagement members 116 can directly engage the one or more rollers 104, wherein said rotation of the engagement members 116 can induce rotation of the one or more rollers 104. In another example, the one or more engagement members 116 can indirectly engage the one or more rollers 104 via the one or more shafts 112, wherein said rotation of the engagement members 116 can induce rotation of the one or more shafts 112 and thereby the one or more rollers 104.

In one or more embodiments, the one or more conveyance mechanisms 106 can operate independently of the one or more rotation mechanisms 114. For example, the one or more conveyance mechanisms 106 can convey the one or more platforms 102 at a conveyance speed that is independent of a speed at which the one or more rotation mechanisms 114 rotates the one or more rollers 104 (e.g., a rotation speed). For instance, a conveyance speed of the one or more platforms 102 can be faster, slower, and/or equal to a rotation speed of the one or more rollers 104. In another instance, the one or more conveyance mechanisms 106 can cease and/or alter operation without impeding and/or altering operation of the one or more rotation mechanism 114, and/or vise-versa. For instance, the conveyance mechanism 106 can stop, reverse, increase, and/or decrease the conveyance speed of the one or more platforms 102 without influencing rotation of the one or more rollers 104 (e.g., influenced and/or controlled by the one or more rotation mechanisms 114). In another instance, the rotation mechanism 114 can stop, reverse, increase, and/or decrease the rotation speed of the one or more rollers 104 without influencing conveyance of the one or more platforms 102 (e.g., influenced and/or controlled by the one or more conveyance mechanisms 106).

For example, the rotation of the one or more rollers 104 can be controlled by the relative difference in the speeds of the one or more rotation members 118 and/or the supporting members 108. For instance, if the one or more rotation members 118 are moving at the same linear speed as the one or more support members 108, the one or more rollers 104 can remain unrotated as they are conveyed along the conveyance direction (e.g., represented by the "C" arrow). In another instance, if the one or more rotation members 118 are propelled in a speed greater than or less than the one or more supporting members 108, the one or more rollers 104 can rotate.

In one or more embodiments, the conveyor system 100 can be positioned (e.g., at least partially) inside an insulated cabinet with a hinged lid for easy access. For example, the conveyor system 100 can extend out through openings on each end of the insulated cabinet, providing areas for loading and unloading. A work cavity of the cabinet can comprise pressurized air supply manifolds located above and below the conveyor system 100. Further, rows of nozzles on each manifold can direct conditioned air onto the one or more rollers 104 from one or more sides. Spent air can be drawn into one or more side manifolds and back into the conditioning system.

Further, the conditioning system can comprise a conditioned air supply ("CAS"), located in an enclosure adjacent (e.g., below) the conveyor system 100. The CAS can be on wheels for easy transport and/or can be configured with a power cord to run on standard 120 VAC power. This self-contained system can provide conditioned air to the conveyor system 100 at programmed temperatures from −15 to 70 degrees Celsius (° C.). Also, a platinum resistance temperature detector ("RTD") sensor located in the supply manifold can be used to monitor and/or control the supply air temperature to within +/−1.0° C. of the programmed set point.

Figure 2:
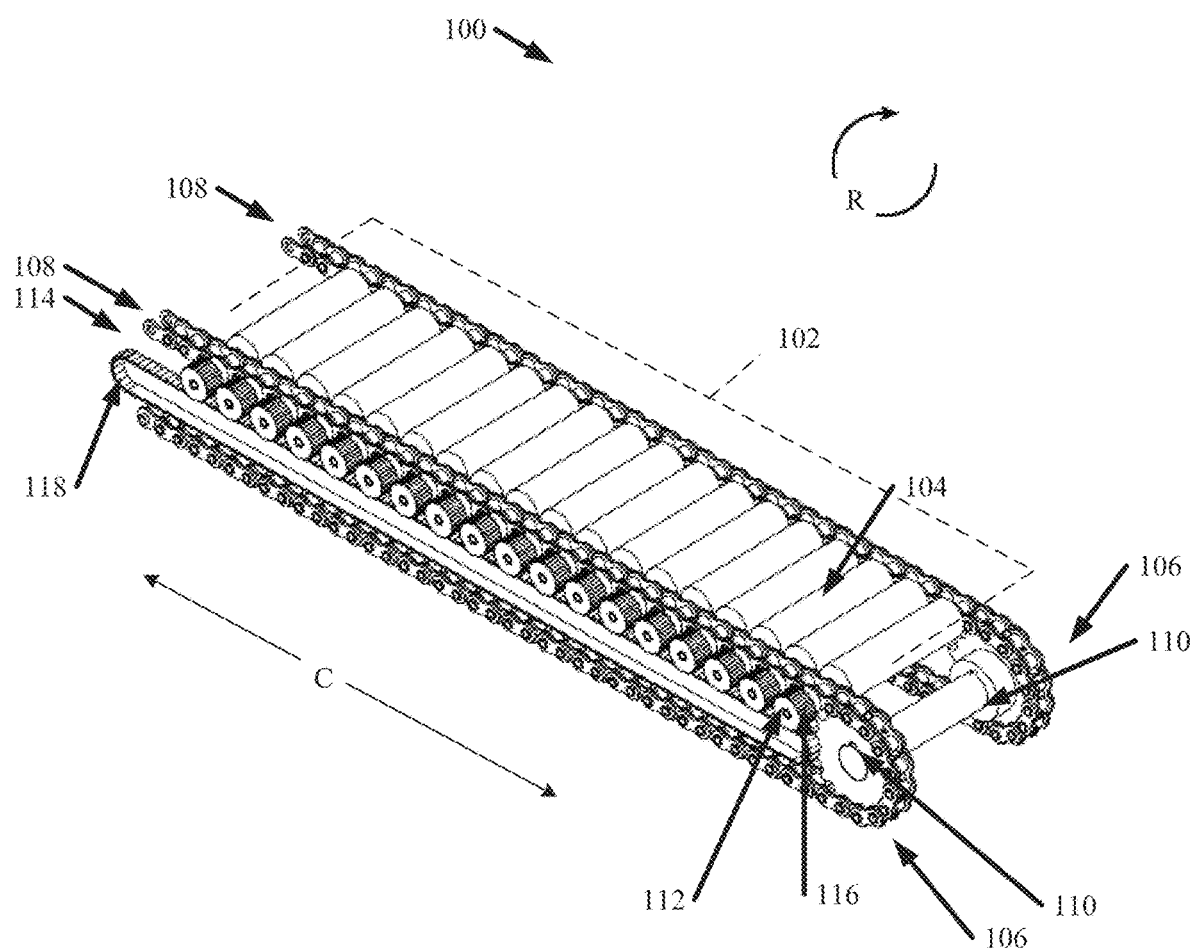
FIG. 2 illustrates a diagram of an example, non-limiting conveyance system that can facilitate conveying an article in one direction while rotating the article in a second direction in accordance with one or more embodiments described herein.

FIG. 2 illustrates a diagram of the example, non-limiting conveyance system 100 that can facilitate conveying an article in the conveyance direction while rotating the article in an axial direction (e.g., the rotation direction) in accordance with one or more embodiments described herein. Repetitive description of like elements employed in other embodiments described herein is omitted for sake of brevity. As shown in FIG. 2, in one or more embodiments, the one or more first driving members 110 can be connected. Thus, one first driving member 110 can operate in conjunction with another first driving member 110. Thereby, a first supporting member 108 can operate in conjunction with a corresponding supporting member 108.

FIG. 3 illustrates a diagram of the example, non-limiting conveyance system 100 from a side perspective in accordance with one or more embodiments described herein. Repetitive description of like elements employed in other embodiments described herein is omitted for sake of brevity. In one or more embodiments, the conveyance system 100 can comprise a single rotation mechanism 114. The rotation mechanism 114 can extend through a portion of the conveyance system 100 and/or through an entirety of the conveyance system 100.

Figure 4:
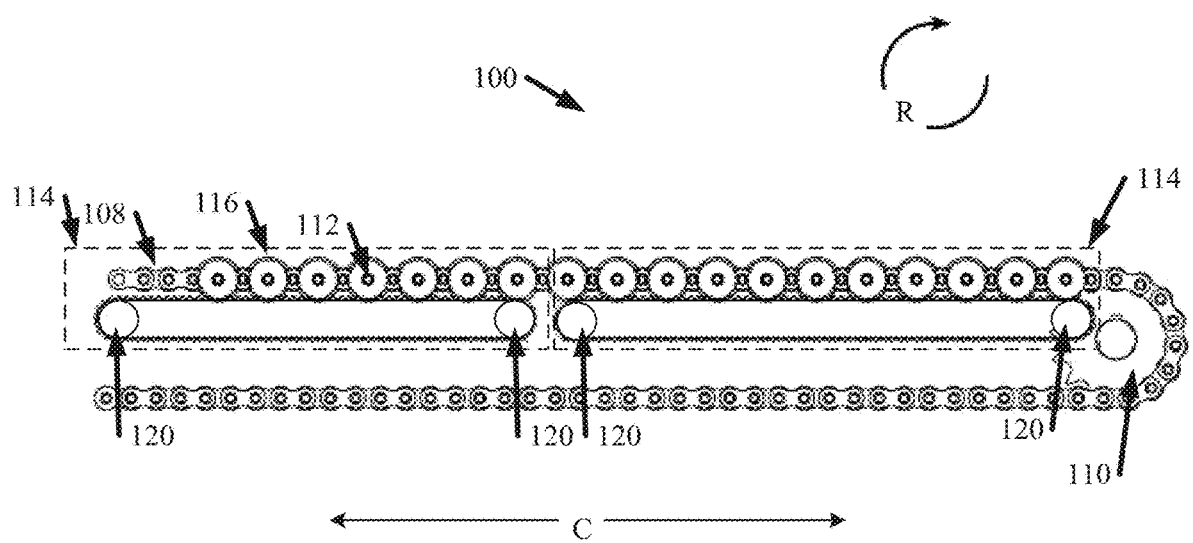
FIG. 4 illustrates a diagram of an example, non-limiting conveyance system that can comprise a conveyance mechanism and multiple rotation mechanism in accordance with one or more embodiments described herein.

FIG. 4 illustrates a diagram of the example, non-limiting conveyance system 100 from the side perspective in accordance with one or more embodiments described herein. Repetitive description of like elements employed in other embodiments described herein is omitted for sake of brevity. In one or more embodiments, the conveyance system 100 can comprise a plurality of rotation mechanism 114. While FIG. 4 illustrates a conveyance system 100 comprising two rotation mechanisms 114, the architecture of the conveyance system 100 is not so limited. For example, one of ordinary skill in the art will readily recognize that the conveyance system 100 can comprise more rotation mechanisms 114 than the two shown in FIG. 4 depending on the number of desired rotation conditions in the conveyance system 100 and/or the length of the conveyance system 100.

As shown in FIG. 4, a plurality of rotation mechanisms 114 can be located on the same side of the one or more platforms 102. Additionally, each rotation mechanism 114 from the plurality can operate independently of other rotation mechanisms 114 from the plurality. For example, a first rotation mechanism 114 can facilitate a first rotation speed and/or direction (e.g., the rotation direction represented by the "R" arrow or an opposite rotation direction), while a second rotation mechanism 114 can facilitate a second, distinct rotation speed and/or direction (e.g., the rotation direction represented by the "R" arrow or an opposite rotation direction). As shown in FIG. 4, respective rotation mechanisms 114 can control the rotation of respective rollers 104 (e.g., one or more respective rollers 104). The use of multiple rotation mechanisms 114 (e.g., operating independently of each other) can enable varying rotation conditions along the one or more platforms 102. Further, said varying rotation conditions can facilitate unique processing techniques regarding the one or more articles being conveyed by conveyance system 100.

Figure 5:
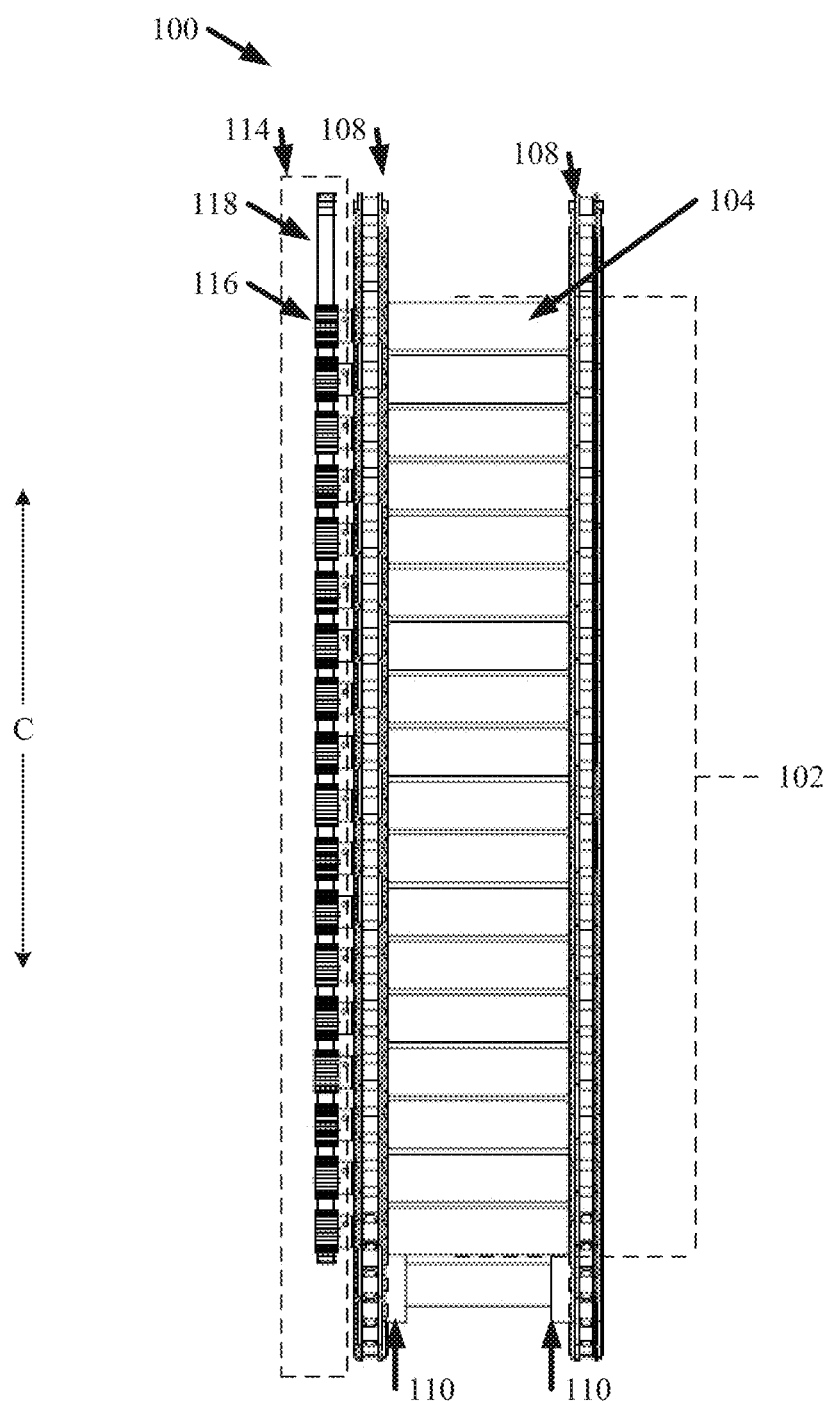
FIG. 5 illustrates a diagram of an example, non-limiting top perspective of a conveyance system that can facilitate conveying an article in one direction while rotating the article in a second direction in accordance with one or more embodiments described herein.

FIG. 5 illustrates a diagram of the example, non-limiting conveyance system 100 from a top-down perspective in accordance with one or more embodiments described herein. Repetitive description of like elements employed in other embodiments described herein is omitted for sake of brevity. As shown in FIG. 5, in one or more embodiments, the one or more engagement members 116 can engage a top surface of the one or more rotation members 118. Further, FIG. 5 depicts the one or more rotation mechanisms 114 located at a single side of the one or more platforms 102. Alternatively, in one or more embodiments, the one or more rotation mechanisms 114 can be located at a plurality of sides of the one or more platforms 102.

Figure 6:
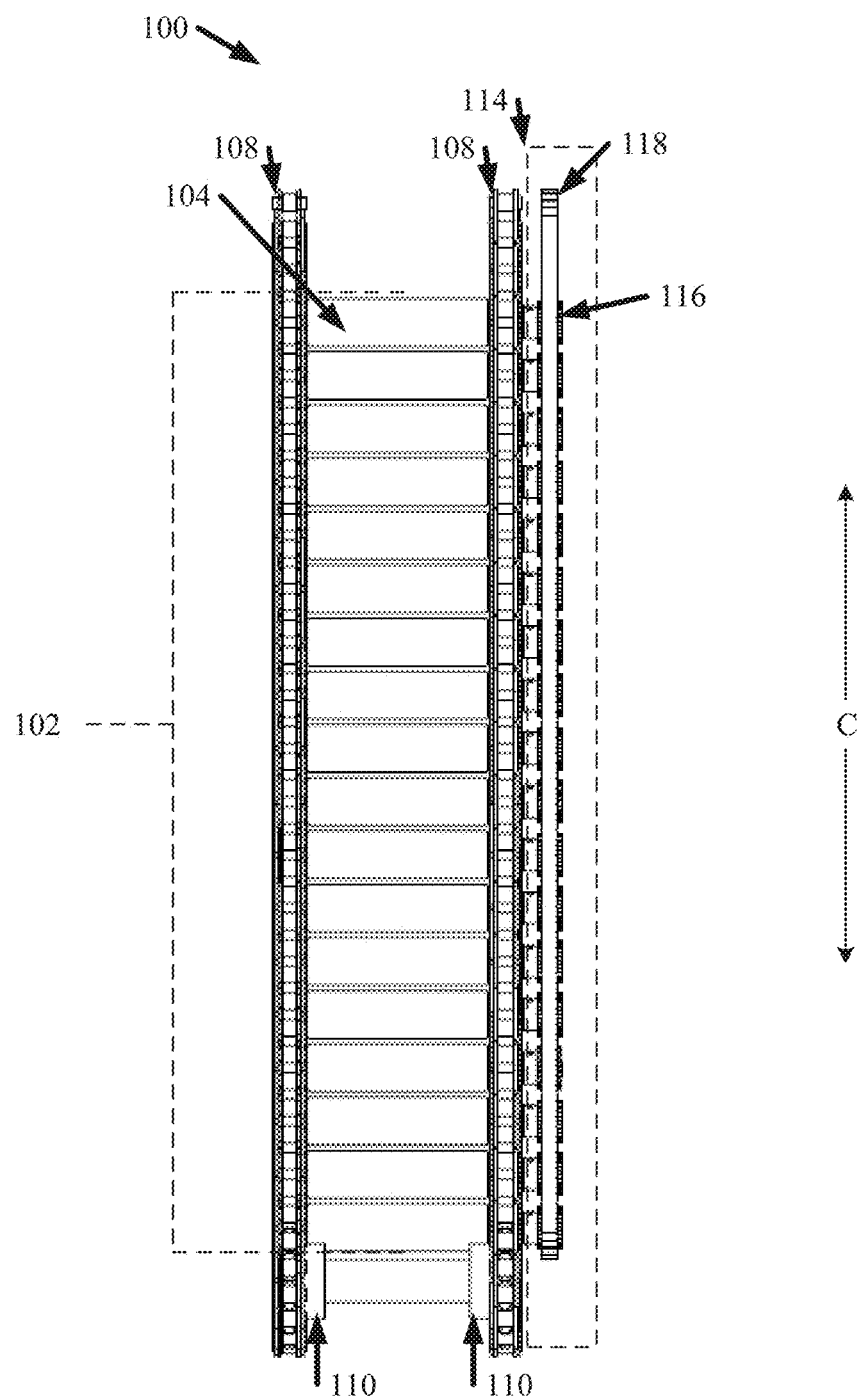
FIG. 6 illustrates a diagram of an example, non-limiting bottom perspective of a conveyance system that can facilitate conveying an article in one direction while rotating the article in a second direction in accordance with one or more embodiments described herein.

FIG. 6 illustrates a diagram of the example, non-limiting conveyance system 100 from a bottom-up perspective in accordance with one or more embodiments described herein. Repetitive description of like elements employed in other embodiments described herein is omitted for sake of brevity. FIG. 6 depicts the one or more rotation mechanisms 114 located at a single side of the one or more platforms 102. Alternatively, in one or more embodiments, the one or more rotation mechanisms 114 can be located at a plurality of sides of the one or more platforms 102. Additionally, while FIG. 6 depicts the one or more rotation mechanisms 114 extending across nearly the entire length of the conveyance system 100, the one or more rotation mechanisms 114 can alternatively be located at portions of the conveyance system 100. Further, said portions can be adjacent to each other along the conveyance path (e.g., along the conveyance direction represented by the "C" arrow) and/or isolated from each other along the conveyance path.

Figure 7A:
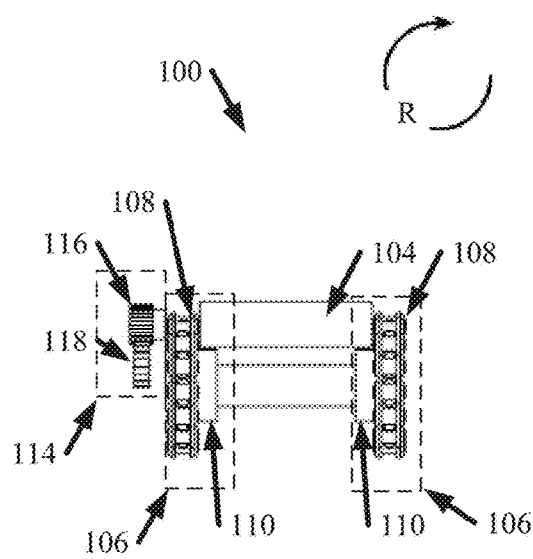
FIG. 7A illustrates a diagram of an example, non-limiting front perspective of a conveyance system that can facilitate conveying an article in one direction while rotating the article in a second direction in accordance with one or more embodiments described herein.
Figure 7B:
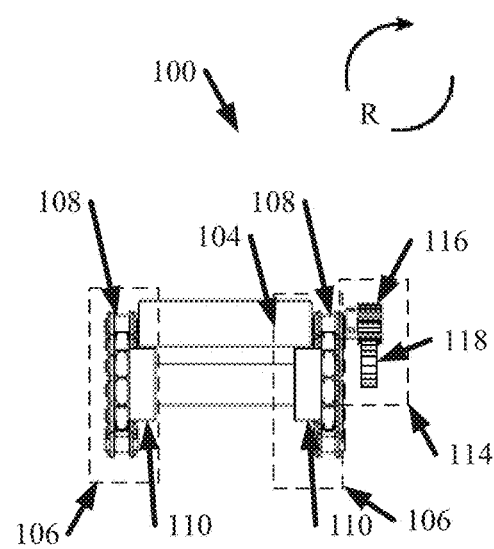
FIG. 7B illustrates a diagram of an example, non-limiting back perspective of a conveyance system that can facilitate conveying an article in one direction while rotating the article in a second direction in accordance with one or more embodiments described herein.

FIGS. 7A and/or 7B illustrate diagrams of the example, non-limiting conveyance system 100, from a front perspective and a back perspective, respectively, in accordance with one or more embodiments described herein. Repetitive description of like elements employed in other embodiments described herein is omitted for sake of brevity. As shown amongst FIGS. 7A and/or 7B, the one or more first driving members 110 can be located at the front of the conveyance system 100, wherein the front of the conveyance system 100 can be a distal end downstream of the back (e.g., another distal end) of the conveyance system 100 along the conveyance direction, and/or vice-versa. However, one of ordinary skill in the art will recognize that the architecture of the conveyance system 100 is not so limited. For example, one or more first driving members 110 can be located at the front of the conveyance system 100, the back of the conveyance system 100, a location between the front and the back of the conveyance system 100, a combination thereof, and/or the like.

Figure 8:
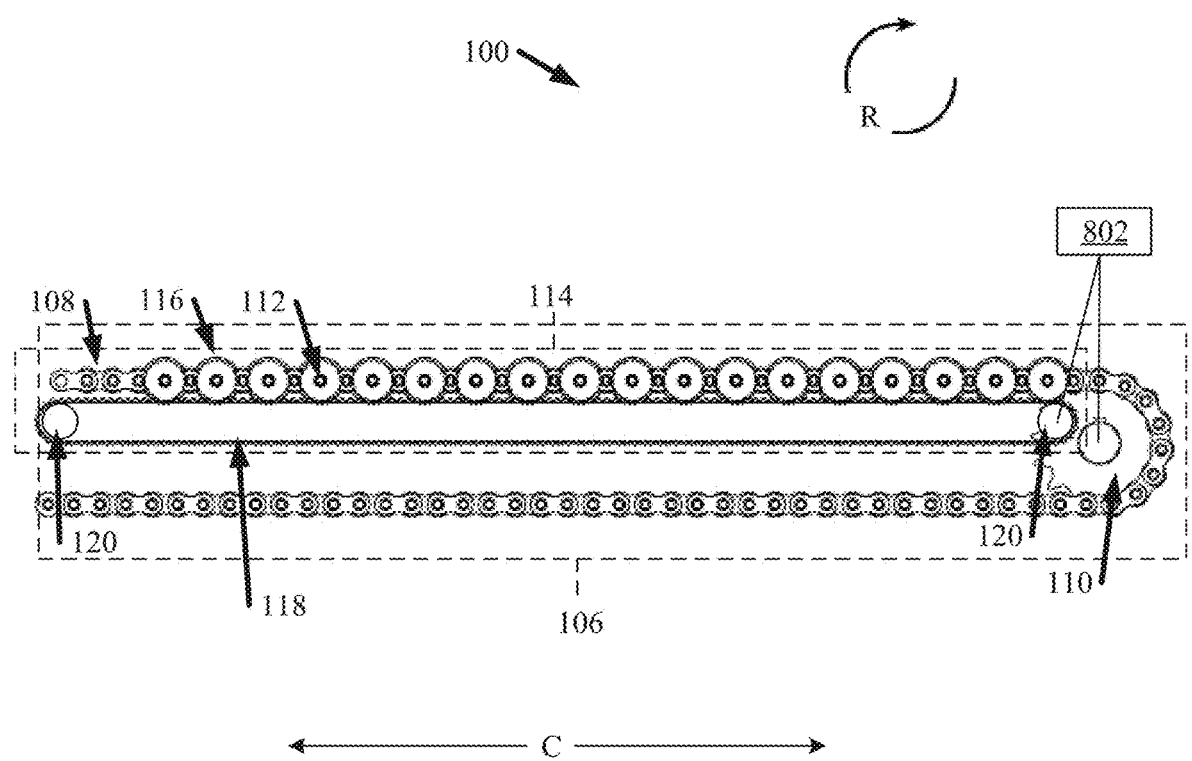
FIG. 8 illustrates a diagram of an example, non-limiting conveyance system that can facilitate conveying an article in one direction via a first controller while rotating the article in a second direction via a second controller in accordance with one or more embodiments described herein.

FIG. 8 illustrates a diagram of the example, non-limiting conveyance system 100 further comprising a master controller 802 that can facilitate operation of the one or more conveyance mechanisms 106 and/or the one or more rotation mechanisms 114. Repetitive description of like elements employed in other embodiments described herein is omitted for sake of brevity.

As shown in FIG. 8, operation of the one or more conveyance mechanisms 106 and/or the one or more rotation mechanisms 114 can be controlled by a master controller 802. For example, the master controller 802 can be operably connected (e.g., via a direct electrical connection and/or via a wireless communication) with the one or more conveyance mechanisms 106 and/or the one or more rotation mechanism 114. For instance, the master controller 802 can be operatively connected to a first motor, which can power the one or more first driving members 110 and thereby the one or more supporting members 108. In another instance, the master controller 802 can be operatively connected to a second motor, which can power the one or more second driving members 120 and thereby the one or more rotation members 118.

The master controller 802 can be a computer device comprising one or more processors. Example computer devices that can comprise the master controller 802 can include, but are not limited to: a desktop computer, a laptop computer, a computerized tablet, a smart device (e.g., a smart phone and/or smart wearable), a combination thereof, and/or the like. Example master controllers 802 can include, but are not limited to, variable speed controllers and/or the like. As described herein, the master controller 802 can operate the one or more conveyance mechanisms 106 independently of the one or more rotation mechanism 114. Further, as described herein, the master controller 802 can operate a plurality of rotation mechanisms 114 independently of each other (e.g., such that rotation conditions amongst the plurality of rotation mechanisms 114 can be consistent and/or vary). While the one or more conveyance mechanisms 106 and/or the one or more rotation mechanisms 114 can be operated independently, the master controller 802 can analyze the respective conveyance conditions and/or rotation conditions of one mechanism (e.g., a conveyance mechanism 106 and/or a rotation mechanism 114) in controlling another mechanism (e.g., a conveyance mechanism 106 and/or a rotation mechanism 114).

One of ordinary skill in the art will recognize that the master controller 802 can control the one or more conveyance mechanisms 106 to operate at various speeds depending on the desired function of the conveyance system 100. For example, the master controller 802 can control the one or more conveyance mechanisms 106 to operate at a conveyance speed greater than or equal to 7.2 and less than or equal to 72 inches per minute. Additionally, one of ordinary skill in the art will recognize that the master controller 802 can control the one or more rotation mechanisms 114 to operate at various speeds depending on the desired function of the conveyance system 100. For example, the master controller 802 can control the one or more rotation mechanisms 114 to operate at a rotation speed greater than or equal to 0 and less than or equal to 15 revolutions per minute.

Figure 9:
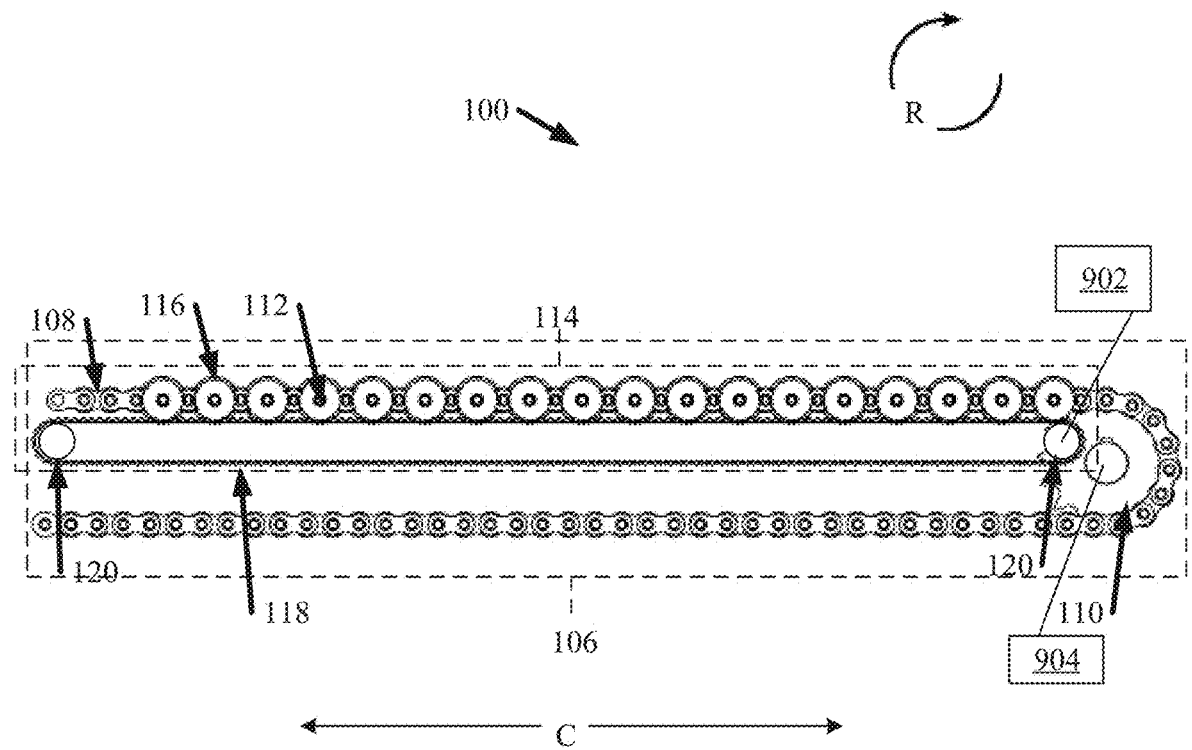
FIG. 9 illustrates a diagram of an example, non-limiting conveyance system that can comprise a controller, which can facilitate conveying an article in one direction while rotating the article in a second direction in accordance with one or more embodiments described herein.

FIG. 9 illustrates a diagram of the example, non-limiting conveyance system 100 further comprising one or more first controllers 902 and/or one or more second controllers 904 to facilitate operation of the one or more conveyance mechanisms 106 and/or the one or more rotation mechanisms 114. Repetitive description of like elements employed in other embodiments described herein is omitted for sake of brevity.

As shown in FIG. 9, operation of the one or more conveyance mechanisms 106 can be controlled via one or more first controllers 902, and the one or more rotation mechanisms 114 can be controlled via one or more second controllers 904. For example, the one or more first controllers 902 can be operably connected (e.g., via a direct electrical connection and/or via a wireless communication) with the one or more conveyance mechanisms 106. For instance, the one or more first controllers 902 can be operatively connected to the first motor, which can power the one or more first driving members 110 and thereby the one or more supporting members 108. Additionally, the one or more second controller 904 can be operably connected (e.g., via a direct electrical connection and/or via a wireless communication) with the one or more rotation mechanisms 114. For instance, the one or more second controllers 904 can be operatively connected to the second motor, which can power the one or more second driving members 120 and thereby the one or more rotation members 118.

The one or more first controllers 902 can be computer devices comprising one or more processors. Example computer devices that can comprise the one or more first controllers 902 can include, but are not limited to: desktop computers, laptop computers, computerized tablets, smart devices (e.g., smart phone and/or smart wearables), a combination thereof, and/or the like. For example, the one or more first controllers 902 can be variable frequency speed controllers. One of ordinary skill in the art will recognize that the architecture of the one or more first controllers 902 is not limited to variable frequency speed controllers; rather, in one or more embodiments, a variety of controllers can be utilized to facilitate the features described herein. As described herein, the one or more first controllers 902 can operate the one or more conveyance mechanisms 106 independently of the one or more rotation mechanism 114. While the one or more conveyance mechanisms 106 and/or the one or more rotation mechanisms 114 can be operated independently, the one or more first controllers 902 can analyze the respective rotation conditions of the one or more rotation mechanisms 114 in controlling the one or more conveyance mechanisms 106. For example, the one or more first controllers 902 can communicate (e.g., via direct electrical connection and/or via a wireless connection) with the one or more second controllers 904. One of ordinary skill in the art will recognize that the one or more first controllers 902 can control the one or more conveyance mechanisms 106 to operate at various speeds depending on the desired function of the conveyance system 100. For example, the one or more first controllers 902 can control the one or more conveyance mechanisms 106 to operate at a conveyance speed greater than or equal to 7.2 and less than or equal to 72 inches per minute.

The one or more second controllers 904 can also be computer devices comprising one or more processors. Example computer devices that can comprise the one or more second controllers 904 can include, but are not limited to: desktop computers, laptop computers, computerized tablets, smart devices (e.g., smart phone and/or smart wearables), a combination thereof, and/or the like. For example, the one or more second controllers 904 can be variable frequency speed controllers. One of ordinary skill in the art will recognize that the architecture of the one or more second controllers 904 is not limited to variable frequency speed controllers; rather, in one or more embodiments, a variety of controllers can be utilized to facilitate the features described herein. As described herein, the one or more second controllers 904 can operate the one or more rotation mechanisms 114 independently of the one or more conveyance mechanism 106. Further, as described herein, the one or more second controllers 904 can operate a plurality of rotation mechanisms 114 independently of each other (e.g., such that rotation conditions amongst the plurality of rotation mechanisms 114 can be consistent and/or vary). While the one or more conveyance mechanisms 106 and/or the one or more rotation mechanisms 114 can be operated independently, the one or more second controllers 904 can analyze the respective conveyance conditions of the one or more conveyance mechanisms 106 in controlling the one or more rotation mechanisms 114. For example, the one or more second controllers 904 can communicate (e.g., via direct electrical connection and/or via a wireless connection) with the one or more first controllers 902. Similarly, while the plurality of rotation mechanisms 114 can be operated independently, the one or more second controllers 904 can analyze the respective rotation conditions of one rotation mechanism 114 in controlling another rotation mechanism 114. For example, the one or more second controllers 904 can communicate (e.g., via direct electrical connection and/or via a wireless connection) with the each other. One of ordinary skill in the art will recognize that the one or more second controllers 904 can control the one or more rotation mechanisms 114 to operate at various speeds depending on the desired function of the conveyance system 100. For example, the one or more second controllers 904 can control the one or more rotation mechanisms 114 to operate at a rotation speed greater than or equal to 0 and less than or equal to 15 revolutions per minute.

Figure 10:
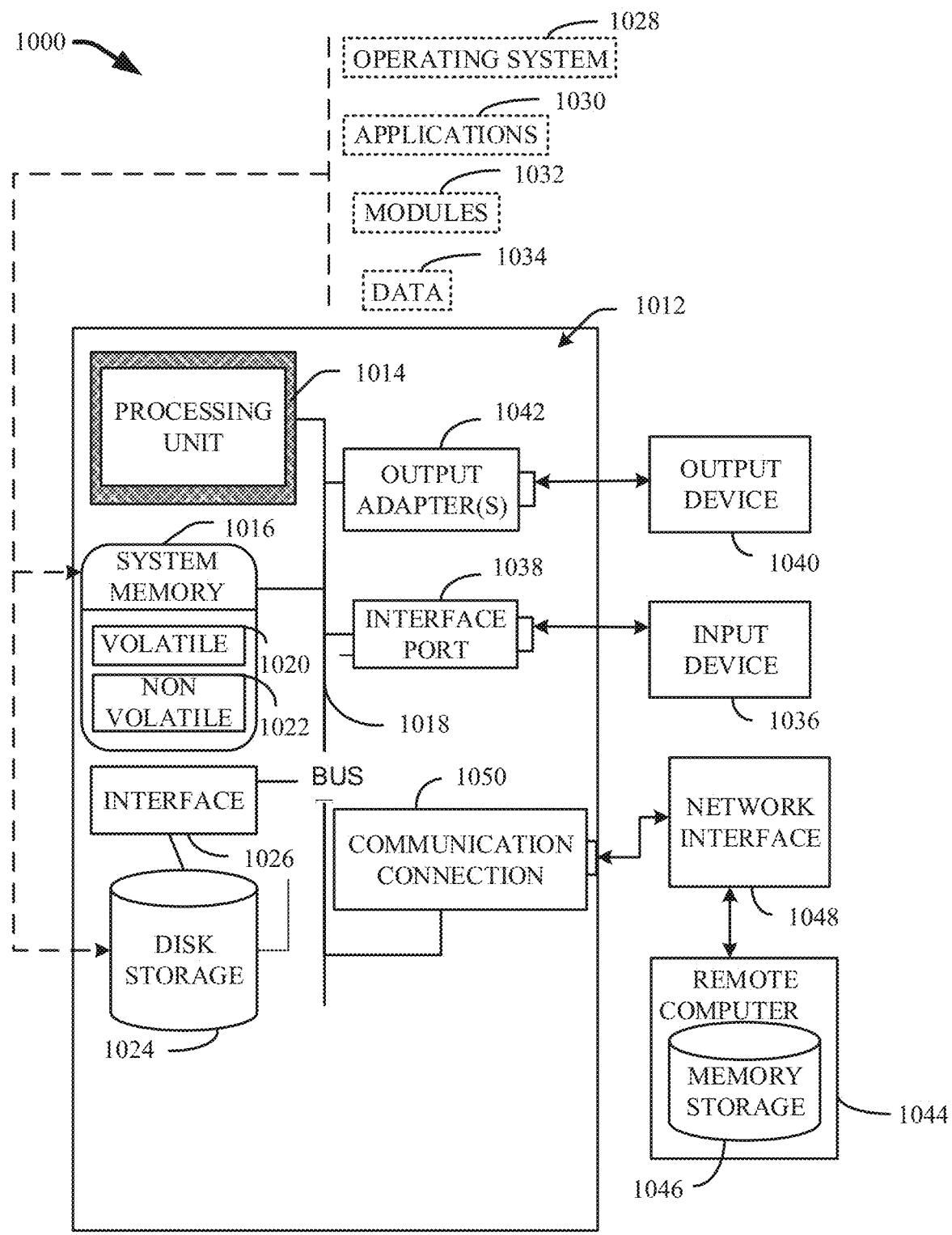
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. For example, the operating environment depicted in FIG. 10 can be comprised within the master controller 802, the one or more first controllers 902, and/or the one or more second controllers 904. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   a roller conveyed along a first direction;
   a first rotation member that, by being propelled along the first direction, drives a first rotation of the roller along a first axial direction; and
   a second rotation member that, by being propelled along the first direction, drives a second rotation of the roller along a second axial direction.

2. The apparatus of claim 1, further comprising:
   a second roller conveyed along the first direction, wherein the second rotation member drives a third rotation of the second roller along the first axial direction or the second axial direction, and wherein the first rotation member and the second rotation member operate independently.

3. The apparatus of claim 2, wherein a rotation speed of the roller is different than a second rotation speed of the second roller.

4. The apparatus of claim 2, wherein a rotation direction of the roller is opposite a second rotation direction of the second roller.

5. The apparatus of claim 2, wherein a shape of the roller is different than a second shape of the second roller.

6. The apparatus of claim 1, wherein a shape of the roller comprises at least one of a plate, a box, a cup, a hemisphere, or a dome.

7. The apparatus of claim 1, wherein the roller comprises at least one of holes, cavities, or compartments.

8. The apparatus of claim 1, wherein a surface of the roller comprises at least one of grooves, notches, ridges, or bumps.

9. A system, comprising:
a first plurality of rollers conveyed along a first direction;
a first rotation member that, by being propelled along the first direction, drives a first rotation of the first plurality of rollers along a first axial direction; and
a second rotation member that, by being propelled along the first direction, drives a second rotation of the first plurality of rollers along a second axial direction.

10. The system of claim 9, further comprising:
a second plurality of rollers conveyed along the first direction, wherein the second rotation member drives a third rotation of the second plurality of rollers along the first axial direction or the second axial direction, and wherein the first rotation member and the second rotation member operate independently.

11. The system of claim 10, wherein a first rotation speed of the first plurality of rollers is different than a second rotation speed of the second plurality of rollers.

12. The system of claim 10, wherein a first rotation direction of the first plurality of rollers is opposite a second rotation direction of the second plurality of rollers.

13. The system of claim 10, wherein first shapes of the first plurality of rollers are different than second shapes of the second plurality of rollers.

14. The system of claim 9, wherein shapes of the first plurality of rollers comprise at least one of plates, boxes, cups, hemispheres, or domes.

15. The system of claim 14, wherein a first shape of a first roller in the first plurality of rollers is different than a second shape of a second roller in the first plurality of rollers.

16. The system of claim 9, wherein the first plurality of rollers comprise at least one of holes, cavities, or compartments.

17. A device, comprising:
one or more first rollers and one or more second rollers conveyed along a first direction;
a first rotation member that, by being propelled along the first direction, drives a first rotation of the one or more first rollers in a first axial direction; and
a second rotation member that operates independently of the first rotation member and that, by being propelled along the first direction, drives a second rotation of the one or more first rollers along a second axial direction.

18. The device of claim 17, wherein the first rotation member rotates the one or more first rollers at a first rotation speed and wherein the second rotation member rotates the one or more first rollers at a second rotation speed, the first rotation speed being different from the second rotation speed.

19. The apparatus of claim 1, wherein the first axial direction and the second axial direction are the same axial direction.

20. The apparatus of claim 1, wherein the first axial direction and the second axial direction are different axial directions.

* * * * *